United States Patent [19]

Fujii et al.

[11] Patent Number: 5,426,548
[45] Date of Patent: Jun. 20, 1995

[54] DISK CLAMPING ASSEMBLY FOR A LOW PROFILE DISK DRIVE APPARATUS

[75] Inventors: Yoshio Fujii, Shinga; Masanobu Chuta; Kazuyuki Yasuda, both of Kyoto, all of Japan

[73] Assignee: Nippon Densan Corporation, Kyoto, Japan

[21] Appl. No.: 23,369

[22] Filed: Feb. 25, 1993

[30] Foreign Application Priority Data

Feb. 29, 1992 [JP] Japan .................................. 4-079032
Feb. 29, 1992 [JP] Japan .................................. 4-079033

[51] Int. Cl.⁶ ........................................... G11B 17/022
[52] U.S. Cl. ........................... 360/98.08; 360/99.12
[58] Field of Search ............ 360/97.01, 98.01, 98.07, 360/98.08, 99.04, 99.05, 99.08, 99.12

[56] References Cited

U.S. PATENT DOCUMENTS

| | | | |
|---|---|---|---|
| 4,747,002 | 5/1988 | Takikawa et al. | 360/99.05 |
| 4,814,652 | 3/1989 | Wright | 360/98.07 |
| 4,864,443 | 9/1989 | Peterson | 360/99.12 |
| 4,918,545 | 4/1990 | Scheffel | 360/98.08 |
| 4,958,839 | 9/1990 | Guzik et al. | 360/99.12 |
| 5,013,947 | 5/1991 | Ide | 360/98.07 |
| 5,101,306 | 3/1992 | Johnson | 360/98.08 |
| 5,243,481 | 9/1993 | Dunckley et al. | 360/99.12 |
| 5,249,090 | 9/1993 | Fehse | 360/98.08 |
| 5,272,581 | 12/1993 | Kojima et al. | 360/98.08 |
| 5,317,225 | 5/1994 | Miyaji et al. | 310/67 R |
| 5,367,418 | 11/1994 | Chessman et al. | 360/99.12 |

*Primary Examiner*—A. J. Heinz
*Assistant Examiner*—Jefferson Evans

[57] ABSTRACT

A disk drive apparatus in which a hard disk is fitted on a disk-fitting outer peripheral portion of a rotor hub. A gap is defined on the outer periphery of the rotor hub such that the axial height of the gap decreases radially inward. An elastic ring member, which is appropriately tensed in the circumferential direction, fits in the gap so as to exert a contracting force which serves to clamp the hard disk between itself and a disk supporting surface. The hard disk can be securely and easily fixed to the rotor hub with uniform application of the clamping pressure over the entire circumference, even when the axial height of the whole disk drive apparatus is reduced.

16 Claims, 3 Drawing Sheets

DISK CLAMPING ASSEMBLY FOR A LOW PROFILE DISK DRIVE APPARATUS

BACKGROUND OF THE INVENTION

1. Field of the Invention

The present invention relates to a disk drive apparatus of the type in which a recording disk is fitted on a rotor hub which is driven to rotate.

2. Description of the Related Art

A disk drive apparatus has been known in which recording disks such as hard disks are mounted on the outer periphery of a rotor hub of a spindle motor. In this type of disk drive apparatus, as disclosed in the U.S. Pat. No. 4,814,652, a hard disk fitted on the rotor hub is carried by a radial extension of the rotor hub and a spacer is placed on the hard disk. Then, a plurality of hard disks and spacers are alternately stacked and fitted on the rotor hub and the stack is finally clamped by a clamp member fixed to the rotor hub. The clamp member is fixed to the upper face of the rotor hub by means of screws at its portion which is radially inside the inner peripheral edges of the hard disks.

In this known structure, the thickness or axial dimension of the disk drive apparatus is inevitably increased due to the presence of the portion of the clamp member radially inside the inner peripheral edge of the hard disk and due to the necessity for the margin of the axial length of the rotor hub which is required for forming the threaded holes. In addition, distortion or warp of the hard disks tends to be caused due to, for example, uneven tightening of the screws for fixing the clamp member.

In order to obviate this problem, an attempt has been made in which the inner peripheral edge of the clamp member and the outer peripheral edge of the rotor hub are threaded so that the clamp member is screwed onto the rotor hub, thereby clamping the hard disks. This arrangement eliminates the necessity for the provision of the portion of the clamp member radially inside the inner peripheral edge of the hard disk, as well as the necessity for formation of threaded holes on the top of the rotor hub, thus remarkably reducing the axial length or thickness of the disk drive apparatus.

The reduction in the axial thickness of the disk drive apparatus also reduces the axial length of the mating portions of the rotor hub and the clamp member. Consequently, fine screw threading has to be conducted both on the inner peripheral surface of the clamp member and the outer peripheral surface of the rotor hub, which is difficult to carry out. Formation of such fine screw threading is extremely difficult particularly when the axial length of the mating region between the rotor hub and the clamp member is small, e.g., 1 mm or so.

The disk drive apparatus of the kind described also employs a labyrinth type seal for preventing bearing lubricant from being scattered to the exterior, thus avoiding contamination of the hard disks and other portions. The sealing effect for preventing external scattering of lubricant will be enhanced by reducing the gap between the rotating part and the seal member and by arranging a greater number of seal members in stages. The reduction in the gap size and increase in the number of the seal members, however, requires a high degree of machining precision, with the result that the cost of production is raised correspondingly. This problem is critical when the axial thickness of the disk drive apparatus is reduced, particularly when the axial thickness is less than 6 mm, more specifically less than 5 mm.

SUMMARY OF THE INVENTION

Accordingly, an object of the present invention is to provide a disk drive apparatus which has further reduced axial thickness but yet capable of easily and securely fixing recording disks to a rotor hub with a high degree of uniformity over the entire circumference.

Another object of the present invention is to provide a disk drive apparatus which better prevents external scattering of lubricant without requiring further complication of the labyrinth seal.

These and other objects, features and advantages of the present invention will become clear from the following description of the preferred embodiments when the same is read in conjunction with the accompanying drawings.

DESCRIPTION OF THE PREFERRED EMBODIMENTS

Preferred embodiments of the disk driving device in accordance with the present invention will be described hereinunder with reference to the accompanying drawings.

First Embodiment

Figure 1:
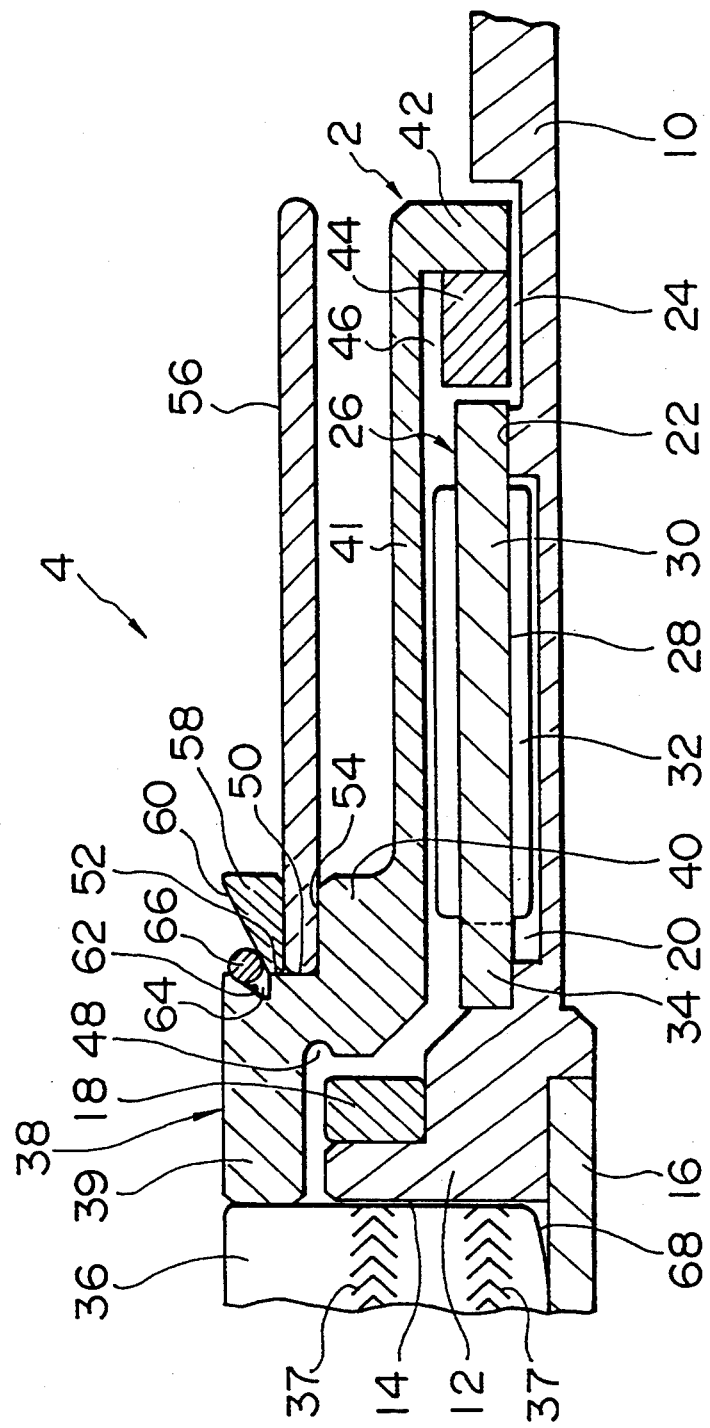
FIG. 1 is a fragmentary sectional view of a first embodiment of a disk drive apparatus in accordance with the present invention, showing a half part of the apparatus.

FIG. 1 shows a disk drive device generally denoted by 4 as the first embodiment of the present invention, incorporating a spindle motor 2 and having an overall axial height of about 5 mm.

Referring to FIG. 1, a base plate 10 of a disk drive apparatus 4 serves also as the base of a spindle motor. A substantially cylindrical bearing portion 12 provided in the base plate 10 has a bearing bore 14 having a circular cross-section. A cover plate 16 is fixed to the lower end of the bearing portion 12. Thus, the bearing bore 14 is closed at its lower end. An annular attracting magnet 18, magnetized in the axial direction, is disposed on an outer peripheral shoulder portion of the bearing portion 12. An upwardly opening first annular recess 20 is formed around the base portion of the bearing portion 12 of the base plate 10. An upwardly opening second annular recess 24 is provided to surround the first annular recess 20. The annular land portion 22 between these annular recesses provides a surface for supporting teeth ends of a core.

An armature 26 is composed of a stator core 28 and a stator coil 32 wound on core teeth 30 of the core 28. The stator core 28 has an annular base 34 which is fixed to the outer periphery of the base portion of the bearing portion 12 of the base plate 10, while the ends of the core teeth 30 rest on the aforementioned supporting surface 22. The lower end portion of the stator coil 32 is received in the first annular recess 20.

A rotor shaft 36 and, hence, a rotor hub 38 made of a ferromagnetic material and fixed to the upper end of the spindle 36, are rotatably supported on the base plate 10 through the bearing portion 12. During the operation, the spindle 36 is borne by fluid-dynamic pressure of the lubricant, e.g., a liquid lubricant, generated as a result of rotation of the spindle 36. In order to stably produce a high pressure of the lubricant, herringbone groove 37 is formed in the outer peripheral portion of the spindle 36.

The rotor hub 38 has a substantially bowl-like form presented by small-diameter upper end portion 39, intermediate-diameter mid portion 40 and a large-diameter lower end portion 41. The small-diameter portion 39 is fixed at its inner periphery to the spindle 36 and the lower end surface of the small-diameter portion 39 faces the upper surfaces of the bearing 12 and the attracting magnet 18 leaving an axial gap therebetween. The inner periphery of the intermediate-diameter mid portion 40 faces the outer peripheral surface of the attracting magnet 18 leaving a radial gap therebetween. The large-diameter portion 41 has the lower surface which opposes the armature leaving an axial gap therebetween.

The large-diameter portion 41 has a peripheral skirt 42 suspended from the outer peripheral edge thereof over its entire circumference. An annular rotor magnet 44 fixed to the inner peripheral surface of the skirt 42 faces the stator core 28 of the armature 26 across a radial gap. The lower faces of the rotor magnet 44 and the skirt 42 and the lower outer peripheral surface of the skirt 42 respectively face the bottom and the outer peripheral side surfaces of the second annular groove 24 across suitable gaps. Thus, the skirt 42 of the large-diameter portion 41, base plate 10 and the rotor magnet 44 form a seal portion which exhibits labyrinth sealing effect.

Radially opening first and second reservoir grooves 46 and 48 are formed inside the rotor hub 38. The first reservoir groove 46 is formed by the lower surface of the large-diameter portion 41 and the inner peripheral surface of the skirt 42 of the rotor hub 38, in cooperation with the upper surface of the rotor magnet 44. The second reservoir groove 48 is formed in the boundary between the lower face of the small-diameter portion 39 and the inner peripheral surface of the intermediate-diameter portion 40 of the rotor hub 38.

The lubricant liquid leaking through the gap between the bearing portion 12 and the small-diameter portion 39 of the rotor hub 38 is displaced radially outward due to centrifugal force produced as a result of rotation of the rotor hub 38. However, since the second reservoir groove 48 opens radially inward at the boundary between the lower face of the small-diameter portion 39 and the inner peripheral surface of the intermediate-diameter portion 40, most of the lubricant liquid is stored in this second reservoir groove 48. The remainder of the lubricant liquid tends to scatter outside through the gap between the base plate 10 and the rotor magnet 44 and the gap between the base plate 10 and the skirt 42 of the rotor hub 38. However, since the radially inward first reservoir groove 46 is formed between the rotor magnet 44 and the rotor hub 38, the lubricant liquid which passes the gap between the armature 26 and the rotor hub 38 is trapped in the first reservoir groove 46 before reaching the gap between the rotor magnet 44 and the base plate 10. Consequently, the scattering of the lubricant liquid to the exterior of the spindle motor unit 2 through the gaps on the base plate 10 is suppressed very effectively. It is therefore possible to effectively prevent external scattering of the lubricant without requiring any precision in the labyrinth seal.

In this embodiment, the lower portion of the outer peripheral surface of the small-diameter portion 39 of the rotor hub 38 provides the outer peripheral portion 50 for fitting the disks, while the intermediate portion of the outer peripheral surface of the portion 39 provides an outer peripheral portion 52 for engaging with the clamp member. In this embodiment, the disk-fitting outer peripheral portion 50 and the clamp-member engaging outer peripheral portion 52 have radii which are substantially equal to each other. This, however, is only illustrative and the clamp-member-fitting outer peripheral portion 52 may have a radius smaller than that of the disk-fitting other peripheral portion 50. The top surface of the intermediate-diameter portion 40 which is radially outside the disk-fitting outer peripheral portion 50 provides a disk supporting surface 54.

The hard disk 56 having an annular form is fitted on the disk-fitting outer peripheral portion 50 without substantial clearance therebetween, thus being located in the radial direction with respect to the rotor hub 38. The lower face of the inner peripheral region of the hard disk 56 rests on the disk supporting surface 54. An annular clamp member 58 fits on the clamp-member-fitting outer peripheral portion 52 without substantial clearance therebetween, thus being located radially with respect to the rotor hub 38, in contact with the upper side of the inner peripheral region of the hard disk 56. The clamp member has a inwardly and downwardly slanting top surface which presents a pressure receiving surface 60. Thus, the clamp member 58 has a wedge-shaped cross-section.

The upper end portion of the outer peripheral surface of the small-diameter portion of the rotor hub 38 has a notch over the entire circumference thereof. The upper surface of the notch presents a converging surface 62 which converges downward, i.e., towards the disk supporting surface 54. The converging surface 62 and the pressure-receiving surface 60 of the clamp member 58 which is radially outside the converging surface 62 in cooperation define a gap 64 the cross-section of which is wedge-shaped so as to reduce its axial size towards the center of the rotor hub. An elastic ring member 66, which is suitably tensed in the circumferential direction, fits in the gap 64. The diameter of the elastic ring member 66 is about 0.5 mm. Preferably, a material having large elasticity modulus and tensile strength, such as a piano wire, is used as the material of the elastic ring member 66, so that the latter may fit under suitable circumferential tension.

Clamping force for clamping the inner peripheral region of the hard disk 56 between the clamp member 58 and the disk supporting surface 54 is applied substantially uniformly over the entire circumference, mainly by virtue of the contracting force exerted by the elastic ring member 66 and the reacting force produced by the converging surface 62. Since the hard disk 56 is clamped at the upper and lower sides of the inner peripheral region thereof, any warp or distortion of the disk, which otherwise may be caused by non-uniform application of clamping force, is avoided.

The lower end surface of the spindle 36 is rounded and convexed downward as at 68, and the apex of this convexed surface is on the axis of rotation of the spindle 36. An electrical contact is established between the apex of the convexed surface 68 and the cover 16, partly because the attracting magnet 18 exerts an axial attracting force on the small-diameter portion 39 of the rotor hub 38 and partly because the lubricant liquid between the apex of the convexed surface 68 and the cover 16 is displaced radially outward by the centrifugal force produced as a result of rotation of the spindle 36. Consequently, any electrostatic charge, which may be produced on, for example, the hard disk 56, can be discharged through the rotor hub 38, spindle 36, cover 16 and the base plate 10, even though the lubricant liquid used is not electrically conductive. A greater electrostatic charge prevention effect is attained when a medium such as an electrically conductive magnetic fluid is used as the lubricant liquid, since in such a case the electrostatic charges can be discharged through a thin film of the lubricant liquid around the point of contact between the apex of the convexed surface 68 and the cover plate 16.

Thus, in the disk drive apparatus as described, the hard disk 56 and the clamp member 58 respectively fit on the disk-fitting outer peripheral portion 50 and the clamp-member-fitting outer peripheral portion 52 of the rotor hub 38, and the elastic ring member 66, which is suitably tensed in the circumferential direction, fits in the gap 64 which is formed between the pressure-receiving surface 60 of the clamp member 58 and the converging surface 62 of the rotor hub 38, so that the clamp member 58 is pressed downward by the contracting force of the elastic ring member 66. Consequently, the hard disk 56 is pressed both at the upper and lower sides of the inner peripheral region thereof between the disk supporting surface 54 and the clamp member 58, with a high degree of uniformity over the entire circumference, thus eliminating the problem of warp or distortion of the hard disk 56 which may otherwise be caused by non-uniform application of the clamping force.

Furthermore, it is possible to reduce the axial thickness of the apparatus as compared with the known apparatus of the type in which the clamp member is fixed to the top of the rotor hub by means of screws. In addition, it is not necessary to effect a minute processing such as that required in the known apparatus in which the inner peripheral surface of the clamp member 58 is screwed to the outer peripheral surface of the rotor hub 38, even when the mating region between these two members has a small axial length. It is therefore possible to securely fix the hard disk 56 even with a small overall axial thickness, e.g., 5 mm or so, of the whole apparatus.

Second Embodiment

Figure 2:
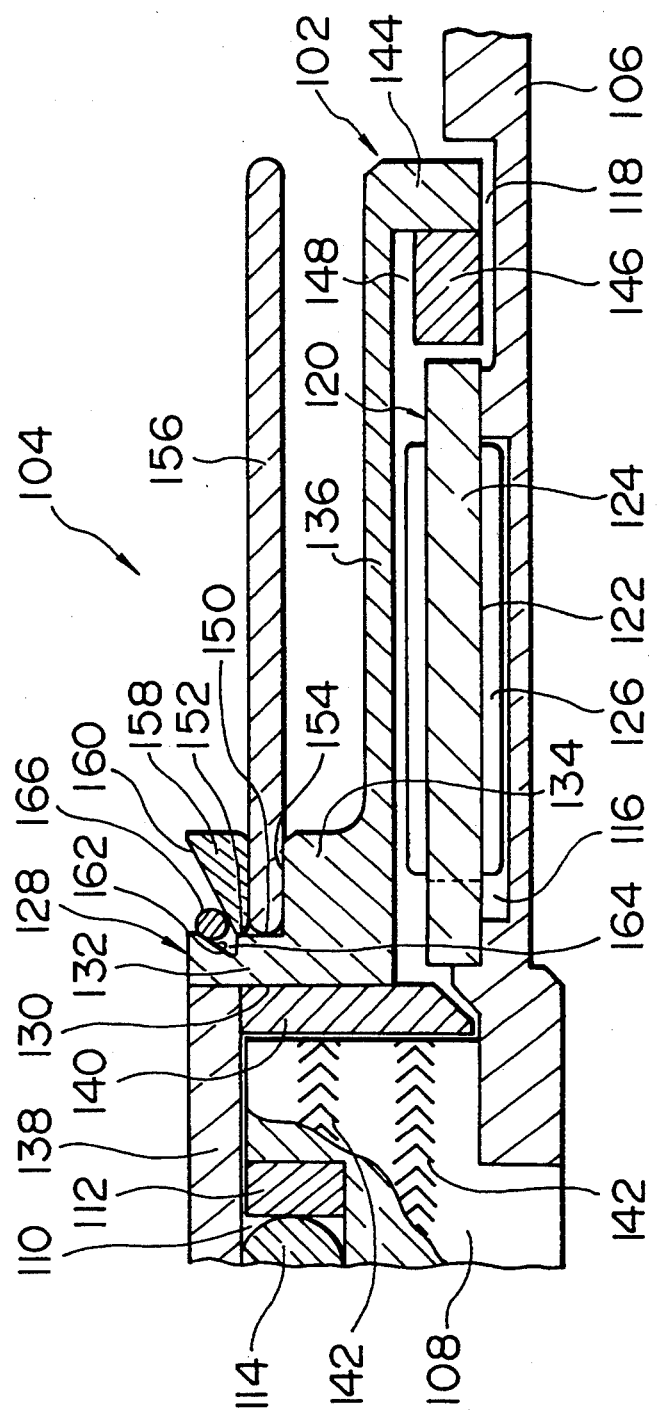
FIG. 2 is a fragmentary sectional view of a second embodiment of a disk drive apparatus in accordance with the present invention, showing half part of the apparatus.

A second embodiment of the disk drive apparatus of the present invention will be described with reference to FIG. 2.

The disk drive apparatus 104 of this embodiment employs a spindle motor 102 and has an overall axial thickness or height of about 5 mm. The disk drive apparatus 104 has a base plate 106 which serves also as the base plate of the spindle motor 102. A bearing 108 is fixed to the base plate 106 to protrude therefrom. An annular attracting magnet 112 which is magnetized in the axial direction is received in a recess 110 which is formed in the top of the bearing 108. A metallic ball 114 is disposed inside the attracting magnet 112. The center of this ball 114 is located in the axis of the bearing 108. Upwardly opened first and second annular recesses 116, 118 are concentrically formed around the bearing 108 on the base plate 106. An armature 120 is composed of a stator core 122 and a stator coil 126 wound on the core teeth 124 of the stator core 122.

The rotor hub 128 has a central through bore 130 and is composed of an uppermost small-diameter portion 132, an intermediate-diameter mid portion 134 and lowermost large-diameter portion 136. The upper end of the through bore 130 is closed by a cover plate 138 which is fixed to the inner side of the small-diameter portion 132 and which is made of a ferromagnetic material. A cylindrical member 140 fits in the portion of the through bore 130 beneath the cover plate 138. The rotor hub 128 is carried by the bearing 108 through this cylindrical member 140, so as to be rotatably held on the base plate 106. The lower face of the cover plate 138 faces the upper faces of the bearing 108 and the attracting magnet 112 across an axial gap. The cylindrical member 140 is borne by fluid-dynamic force of a lubricant. e.g., a liquid lubricant, produced as a result of rotation of the cylindrical member 140. In order that a high bearing pressure is stably produced, herringbone grooves 142 are formed in the outer peripheral surface of the bearing 108.

The lower face of the large-diameter portion 136 of the rotor hub 128 opposes the armature 120 across an axial gap, and a skirt 144 is formed on the outer peripheral end of the large-diameter portion 136 over the entire circumference thereof. An annular rotor magnet 146 is fixed to the inner periphery of the skirt 144 and opposes the stator core 122 across a radial gap. The lower faces of the rotor magnet 146 and the skirt 144 and the lower portion of the outer peripheral surface of the skirt 144 oppose the bottom and outer peripheral side surface of the second annular recess 118, respectively, across suitable gaps. The rotor magnet 146, the skirt 144 and the base plate 106 form a seal portion which exhibits sealing effect similar to that of a labyrinth seal.

A radially inwardly opening annular reservoir groove 148 is formed in the inner side of the of the rotor hub 128. The reservoir groove 148 is defined by the lower face of the large-diameter portion 136, inner peripheral surface of the skirt 144 and the upper surface of the rotor magnet 146. The lubricant liquid which has leaked out through the gap between the base plate 106 and the cylindrical member 140 is displaced radially outward by, for example, the centrifugal force generated as a result of the rotation of the rotor hub 128, and tends to scatter to the exterior of the spindle motor 102 past the gap between the armature 120 and the rotor hub 128, the gap between the rotor magnet 146 and the base plate 106 and the gap between the skirt 144 of the rotor hub 128 and the base plate 106. However, since the reservoir groove 148 is formed between the rotor magnet 146 and the rotor hub 128 so as to open radially inward, most of the lubricant liquid which has passed the gap between the armature 120 and the rotor hub 128 is trapped in the groove 148 before reaching the gap between the rotor magnet 146 and the base plate 106. Consequently, the rate of scattering of the lubricant liquid to the exterior of the spindle motor 102 past the gaps on the base plate 106 is greatly reduced. It is thus possible to effectively prevent external scattering of the lubricant liquid without requiring any precision in the labyrinth seal portion.

The lower portion of the outer peripheral surface of the small-diameter portion 132 of the rotor hub 128 provides a disk-fitting outer peripheral portion 150, while the intermediate portion of the outer peripheral surface of the portion 132 provides a clamp-member-fitting outer peripheral portion 152. The top surface of the intermediate-diameter portion 134 serves as a disk supporting surface 154.

The hard disk 156 having an annular form is fitted on the disk-fitting outer peripheral portion 150 without substantial clearance therebetween, with the lower side of the inner peripheral region of the disk resting on the disk supporting surface 154. The annular clamp member 158 fits on the clamp-member-fitting outer peripheral portion 152 without substantial clearance therebetween. The clamp member 158 has an inwardly and downwardly slanting top surface which presents a pressure receiving surface 160. Thus, the clamp member 158 has a wedge-shaped cross-section.

The upper end portion of the outer peripheral surface of the small-diameter portion 132 of he rotor hub 128 has a notch over the entire circumference thereof. The upper surface of the notch presents a converging surface 162. The converging surface 162 and the pressure-receiving surface 160 of the clamp member 158 in cooperation define a gap 164, the cross-section of which is wedge-shaped so as to reduce its axial size towards the center of the rotor hub.

An elastic ring member 166, which is suitably tensed in the circumferential direction and which is about 0.5 mm in diameter, fits in the gap 164. Clamping force for clamping the inner peripheral region of the hard disk 156 between the clamp member 158 and the disk supporting surface 154 is applied substantially uniformly over the entire circumference, mainly by virtue of the contracting force exerted by the elastic ring member 166 and the reacting force produced by the converging surface 162. Since the hard disk 156 is clamped at the upper and lower sides of the inner peripheral region thereof, any warp or distortion of the disk 156, which otherwise may be caused by non-uniform application of clamping force, is avoided.

The second embodiment described hereinbefore also provides the same effect as the first embodiment in attaining reduced overall axial thickness of the whole apparatus.

Third Embodiment

Figure 3:
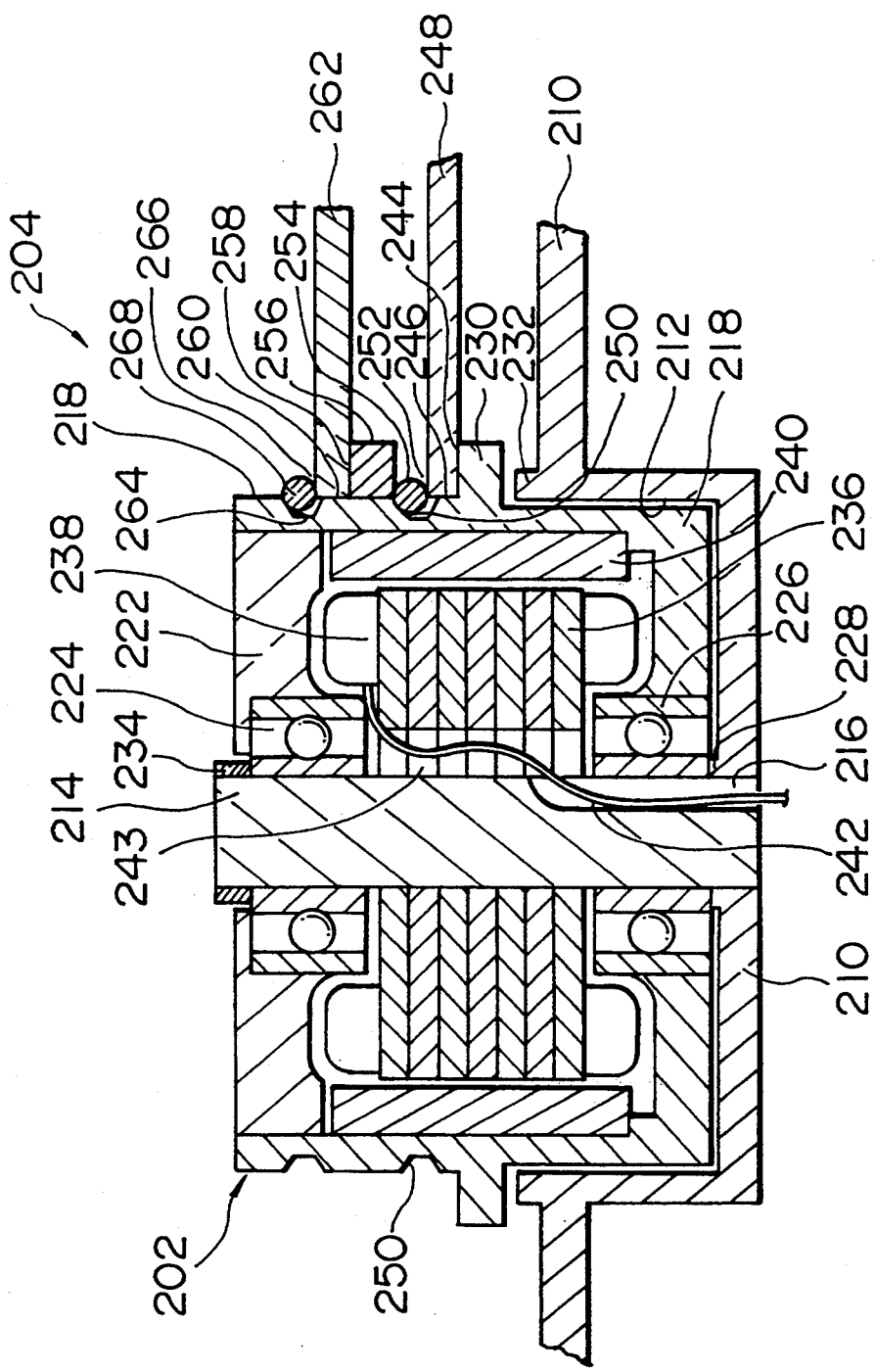
FIG. 3 is a fragmentary sectional view of a third embodiment of a disk drive apparatus in accordance with the present invention, showing half part of the apparatus.

FIG. 3 shows a disk drive apparatus 204 as the third embodiment of the present invention, which employs a spindle motor 202 and which has an overall thickness of 9 mm. The left half part of this Figure shows the apparatus in a state in which the apparatus does not carry hard disks.

A base plate 210 has a recess 212 of a circular cross-section, to the center of which is fitted and fixed is the lower end of a fixed column 214 having a cylindrical form. A guide groove 216 is provided to extend from a vertically mid portion of the fixed column 214 to the lower end of the same. The surfaces of the walls defining this guide groove 216 are coated with an insulating paint. This fixing column 214 can be formed by, for example, coating a cylindrical member with the guide groove 216 by electrodeposition or electrostatic coating technique and then grinding the outer surface of the cylindrical member until the desired diameter is obtained. Electrodeposition technique is preferably used because this method makes it possible to form a thin coating film and provides high efficiency of the work.

A rotor hub 218 has a substantially bowl-like form. An annular member 222 is fitted inside the upper opening of the rotor hub 218. The rotor hub 218 and the annular member 222 integral therewith are supported through upper and lower ball bearings 224 and 226 for rotation relative to the fixed column 214.

An annular projection 228 is formed on the portion of the base plate 210 around the fixed column 214. The lower end of an inner race of the lower ball bearing 226 rests on the annular projection 228. The lower end of the rotor hub 218 fits in the recess 212 in the base plate 210 leaving a slight gap therebetween.

A radial projection of collar 230 is formed on the heightwise mid portion of the outer peripheral surface of the rotor hub 218, and is located at a level slightly above the level of an annular upward projection 232 provided on the periphery of the recess 212. With this arrangement, a seal of labyrinth type is formed between the base plate 210 and the rotor hub 218, which effectively prevents lubricant in the lower ball bearing 226 from being externally scattered through the gap between the collar 230 and the upward projection 232.

An annular bush member 234 is fitted to the outside of the upper end portion the fixed column 214. The outer peripheral surface of the bush member 234 faces the inner peripheral surface of the annular member 222 leaving a slight gap therebetween. This arrangement produces labyrinth type sealing effect to prevent the lubricant in the upper ball bearing 224 from being externally scattered.

A stator core 236 is fitted on the portion of the fixed column 214 between the upper and lower ball bearings 224 and 226. A stator coil 238 is wound on the stator core 236.

On the other hand, a cylindrical rotor magnet 240 is fixed on the inner periphery of the rotor hub 218 so as to oppose the stator core 236 across a radial gap.

A lead-out portion 242 of the stator coil 238 is led to the space under the base plate 210 via a notch or groove 243 provided on the inner periphery of the stator core 236 and the guide groove 216 formed in the fixed column 214. Preferably, the portion of the lead-out 242 extending through the guide groove 216 is fixed in the guide groove 216 in order to avoid troubles such as cutting of the wire. Electrical insulation is sufficiently ensured even when the insulating coating on the lead-out portion 242 has come off, by virtue of the insulating coating provided on the surfaces defining the guide groove 216.

The upper surface of the extension or collar 230 of the rotor hub 218 provides a first disk supporting surface 244. The portion of the outer peripheral surface of the rotor hub 218 which is above the level of the first disk supporting surface 244 provides a first disk-fitting outer peripheral portion 246. An annular first hard disk 248 fits on the first disk-fitting outer peripheral portion 246 without substantial radial gap, so as to be located radially with respect to the rotor hub 218, so that the lower face of the inner peripheral region of the first hard disk 248 is supported on the first disk supporting surface 244.

A circumferential notch is formed in an upper portion of the first disk-fitting outer peripheral portion 246 of the rotor hub 218, over the entire circumference of the latter. The upper surface of the notch provides a first converging surface 250 which converges downward towards the first disk supporting surface 244. The first converging surface 250 and the upper surface of the inner peripheral region of the first hard disk 248 provides a first annular gap 252 of a wedge-shaped cross-section which reduces the axial height towards the center of the rotor hub.

A first elastic ring member 254 which is properly tensed in the circumferential direction and which has a diameter of about 0.5 mm fits in the first gap 252. Although the elastic ring member 254 may be made from various materials such as a synthetic resin, a synthetic rubber or a metal, it is preferred that this member is made from a material having sufficiently large elasticity modulus and tensile strength, in order that the elastic ring member may fit with an appropriate level of tension. It is also preferred that at least the portion of the elastic ring member 254 contacting the hard disk 248 is made of a material which would not damage the hard disk 248, such as a fluoro-rubber.

Both the upper and lower sides of the inner peripheral region of the first hard disk 248 are pressed and clamped between the first disk supporting surface 244 and the first ring member 254 uniformly over the entire circumference, mainly by the contracting force of the first elastic ring member 254 and the reacting force produced by the first converging surface 250 in response to the contraction of the first elastic ring member 254. It is therefore possible to avoid warp or distortion of the first hard disk 248 which otherwise would be caused by non-uniform application of the clamping pressure.

An annular spacer 256 fits on the portion of the outer peripheral surface of the rotor hub 218 immediately above the first elastic ring member 254 so as to be supported on the first elastic ring member 254. The upper surface of the spacer 256 provides a second disk supporting surface 258. The portion of the outer peripheral surface of the rotor hub 218 immediately above the second disk supporting surface 258 provides a second disk-fitting outer peripheral portion 260. An annular second hard disk 262 fits on the second disk-fitting outer peripheral portion 260 without substantial gap, so as to be radially located with respect to the rotor hub 218. The lower surface of the inner peripheral region of the second hard disk 262 rests on the second disk supporting surface 258.

A circumferential notch is formed in the portion of the outer peripheral surface of the rotor hub 218 above the second disk-fitting outer peripheral portion 260. The upper surface of the notch provides a second converging surface 264 which reduces its diameter towards the second disk supporting surface 258. The second converging surface 264 and the upper surface of the inner peripheral region of the second hard disk 262 provides a second gap 266 of a wedge-shaped cross-section the axial height of which decreases towards the center of the rotor hub.

Both the upper and lower sides of the inner peripheral region of the second hard disk 262 are pressed and clamped between the second disk supporting surface 258 and the second elastic ring member 268, uniformly over the entire periphery, mainly by the contracting force of the second elastic ring member 268 which has been properly tensed circumferentially and which has a diameter of about 0.5 mm and by the reacting force which is produced by the second converging surface 264 in response to the contracting force of the second elastic ring member 268. It is therefore possible to avoid any warp or distortion of the second hard disk 262 which otherwise would be caused due to non-uniform application of the clamping pressure.

The axial thickness or height required for clamping the hard disks 248, 262 is very small also in the disk drive apparatus 204 having the described construction. More specifically, it is possible to easily and securely fix the first and second hard disks 248 and 262 by means of the first and second elastic ring members 254 and 268, with the overall axial thickness or height of the apparatus being about 9 mm or so.

Although the third embodiment as described mounts and operates two hard disks on the rotor hub 218, this is only illustrative and it is possible to employ only one or three or more hard disks. The hard disk is preferably but not exclusively of the type which has a substrate made of an aluminum type material or a glassy material with a magnetic coating film formed thereon.

Although preferred embodiments of the disk drive apparatus of the present invention have been described, it is to be understood that the described embodiments are only illustrative and various changes and modifications may be imparted thereto without departing from the scope of the present invention which is limited solely by the appended claims.

What is claimed is:

1. A disk drive apparatus, comprising:
    a rotationally driven rotor hub;
    a disk supporting surface provided on said rotor hub for carrying an inner peripheral region of an annular recording disk;
    an annular clamp member fitted on said rotor hub and disposed on the upper surface of the inner peripheral region of said recording disk;
    a pressure-receiving surface formed on the upper side of said clamp member and tapered downward and radially inward;
    an annular groove formed in a portion of the outer peripheral surface of said rotor hub, immediately above said clamp member, over the entire circumference of said rotor hub;
    a converging surface defined by the upper wall surface of said annular groove and converging downward towards the center of the rotor hub;
    said converging surface and said pressure-receiving surface in cooperation defining a gap having a substantially wedge-shaped cross-section, the axial height of the gap defined by the axial distance between the converging surface and the pressure receiving surface progressively decreasing in a direction towards the center of the rotor hub; and
    an elastic ring member fitting in said gap with a radially inwardly contracting force so as to exert on said clamp member a force which causes said clamp member to clamp said recording disk in cooperation with said disk supporting surface.

2. A disk drive apparatus according to claim 1, wherein said rotor hub has an uppermost small-diameter portion, an intermediate-diameter mid portion and a lowermost large-diameter portion, said disk supporting surface being formed on the upper side of said intermediate-diameter portion, said annular groove being formed in the outer peripheral surface of said small-diameter portion.

3. A disk drive apparatus according to claim 2, wherein said large-diameter portion has a skirt projecting downward from the outer peripheral end thereof, said disk drive apparatus further comprising: a base plate; a rotor magnet fixed to the inner peripheral surface of said skirt; and a stator fixed to the outer periphery of a bearing portion of said base plate such that the outer peripheral surface of said stator faces the inner peripheral surface of said rotor magnet leaving a slight gap therebetween.

4. A disk drive apparatus according to claim 3, wherein a spindle is fixed at its upper end to the center of said rotor hub, said spindle being rotatably supported by said bearing portion.

5. A disk drive apparatus according to claim 4, wherein herringbone grooves for producing a fluid dynamic pressure are formed in the outer peripheral surface of said spindle, said spindle being received in a bearing bore formed in said bearing portion, with the gap between the inner peripheral surface of said bearing bore and the outer peripheral surface of said rotary shaft being filled with a lubricant liquid.

6. A disk drive apparatus according to claim 5, wherein the lower end of said spindle is convexed downward and the apex of the convexed lower end of said spindle making a point contact with the inner bottom surface of said bearing bore so as to maintain an electrical connection therebetween.

7. A disk drive apparatus according to claim 5, wherein said lubricant liquid is an electrically conductive magnetic fluid.

8. A disk drive apparatus according to claim 5, wherein said rotor hub is made of a ferromagnetic material, said disk driving apparatus further comprising a magnet provided on said bearing portion and attracting said rotor hub so as to prevent said spindle from separating from said bearing bore.

9. A disk drive apparatus according to claim 5, wherein a radially-inwardly opening reservoir groove is formed in the portion of the inner peripheral surface of said rotor hub corresponding to the upper end of said bearing portion, for receiving lubricant liquid leaked from said bearing portion.

10. A disk drive apparatus according to claim 9, wherein another radially-inwardly opening reservoir groove is formed between said rotor hub and said rotor magnet.

11. A disk drive apparatus according to claim 3, wherein an annular recess is formed in said base plate, the lower end portions of said skirt and said rotor magnet being received in said annular recess leaving slight gaps therebetween, said base plate and the stator core of said stator forming a labyrinth-type seal portion.

12. A disk drive apparatus according to claim 1, wherein said rotor hub is rotatably supported on a fixed shaft fixed on a base plate.

13. A disk drive apparatus according to claim 12, further comprising: a cylindrical member and a cover plate closing the open upper end of said cylindrical member, and herringbone grooves for generating fluid dynamic pressure formed in the outer peripheral surface of said fixed shaft, said fixed shaft being received in said cylindrical member, with the gap between the inner peripheral surface of said cylindrical member and the outer peripheral surface of said fixed shaft being filled with a lubricant liquid.

14. A disk drive apparatus according to claim 13, wherein a metallic ball is fixed on the top of said fixed shaft concentrically with said fixed shaft in point contact with said cover plate.

15. A disk drive apparatus according to claim 14, wherein said cover plate is made of a ferromagnetic material, and an annular magnet is concentrically embedded in the top of said fixed shaft.

16. A disk drive apparatus according to claim 1, wherein said elastic ring member is made of a material having high levels of elasticity modulus and tensile strength.

* * * * *